United States Patent
Gupta et al.

(10) Patent No.: US 12,479,473 B2
(45) Date of Patent: Nov. 25, 2025

(54) FAST PROBABILITY-OF-COLLISION COMPUTATION

(71) Applicant: GM Cruise Holdings LLC, San Francisco, CA (US)

(72) Inventors: Ujjwal Das Gupta, Alameda, CA (US); Rostyslav Lesiv, San Francisco, CA (US); Bradley Larkin Saund, San Carlos, CA (US); Dmitry Panin, San Carlos, CA (US); Samuel J Abrahams, Falls Church, VA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 393 days.

(21) Appl. No.: 18/160,649

(22) Filed: Jan. 27, 2023

(65) Prior Publication Data
US 2024/0253665 A1   Aug. 1, 2024

(51) Int. Cl.
*B60W 60/00*    (2020.01)
*B60W 30/095*   (2012.01)
*B60W 40/02*    (2006.01)

(52) U.S. Cl.
CPC ...... *B60W 60/0016* (2020.02); *B60W 30/095* (2013.01); *B60W 40/02* (2013.01); *B60W 2420/00* (2013.01); *B60W 2554/80* (2020.02)

(58) Field of Classification Search
CPC . B60W 60/0016; B60W 30/095; B60W 40/02
See application file for complete search history.

(56) References Cited

U.S. PATENT DOCUMENTS

| | | | | |
|---|---|---|---|---|
| 2022/0161792 A1* | 5/2022 | Murata | ............ | B60W 30/0956 |
| 2023/0278581 A1* | 9/2023 | Ollis | ................. | B60W 60/0011 701/23 |
| 2023/0347880 A1* | 11/2023 | Clawson | ................ | G06V 20/58 |

OTHER PUBLICATIONS

Andreas Philipp et al., "Analytic Collision Risk Calculation for Autonomous Vehicle Navigation", 2019 International Conference on Robotics and Automation (ICRA), IEEE, May 20-24, 2019.

* cited by examiner

*Primary Examiner* — Luke Huynh
(74) *Attorney, Agent, or Firm* — CANTOR COLBURN LLP (57) ABSTRACT

Systems and methods are provided herein for an AV to more efficiently, quickly, and accurately determine a likelihood of collision with another object, for example, by recursive triangulation. A candidate trajectory of the AV is then selected for controlling the AV based on the determined likelihood(s) of collision. According to one example, the likelihood of collision is determined by: 1) recursively triangulating a convex hull that defines all of the locations in which a collision would occur between the object and the AV (e.g., in a manner similar to the Sierpiński method), and 2) multiplying the area of each resulting triangular region by the value of a probability density that defines all of the locations in which a collision would occur between the object and the AV function in that region.

20 Claims, 6 Drawing Sheets

FAST PROBABILITY-OF-COLLISION COMPUTATION

TECHNICAL FIELD

The present disclosure generally relates to the control of autonomous vehicles (AVs) and, more specifically, to the determination of a trajectory based on a likelihood of collision with non-AV agents (sometimes referred to as non-player characters (NPCs)).

BACKGROUND

An autonomous vehicle (AV) is a motorized vehicle that can navigate without a human driver. An exemplary autonomous vehicle can include various sensors that provide data and measurements to an internal computing system of the AV, which can use the data and measurements to control a mechanical system of the AV (e.g., a vehicle propulsion system, a braking system, or a steering system). More particularly, these data and measurements can be used to determine locations of non-AV agents (NPCs), such as other vehicles, pedestrians, bicycles, and the like, at a current time t=0, and predict NPC locations at a future time t>0. The AV may then be controlled to proceed on a trajectory that minimizes the chance of interference (e.g., a collision) with the NPC.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

SUMMARY

Systems and methods are provided herein for an AV to more efficiently, quickly, and accurately determine a likelihood of collision with another object. For one or more objects for which one or more trajectories are predicted, and for one or more candidate trajectories of the AV, a likelihood of collision is determined. A candidate trajectory is selected based on the likelihood(s) of collision with the one or more objects, and the AV is controlled according to that selected trajectory. The likelihood of collision is determined, for example, by integrating a probability density function (which identifies the probabilities of the object at a given location according to a predicted trajectory of that object) over the locations of a convex hull (which defines all of the locations in which a collision would occur between the object and the AV). This integration may be efficiently estimated by recursively dividing the convex hull into a plurality of triangular regions (e.g., in a manner similar to the Sierpinski method) and multiplying the area of each triangular region by the value of the probability density function at that region.

According to one aspect, a method of controlling an AV is provided, which comprises: determining a convex hull of all centroids locations of an object (e.g., an NPC) that will result in collision between the NPC and AV, according to a first predicted trajectory of the NPC and a first candidate trajectory of the AV; recursively dividing the convex hull into a plurality of triangular regions; for each of the plurality of triangular regions, determining a representative probability that the NPC will be in the triangular region, and determining a collision probability as a product of the representative probability and an area of the triangular region; determining a likelihood of collision between the NPC along the first predicted trajectory and the AV along the first candidate trajectory as a sum of the collision probabilities of the plurality of triangular regions; selecting the first candidate trajectory among a plurality of candidate trajectories of the AV based on the determined likelihood of collision; and controlling the AV along the selected first candidate trajectory.

According to another aspect, an AV is provided, which comprises: a plurality of sensors; a local computing device comprising one or more processors and memory configured to operate a perception stack, a mapping and localization stack, a planning stack, and a control stack; and vehicle propulsion, braking, and steering systems, wherein the perception stack is configured to identify an object (NPC) and predict a plurality of trajectories of the NPC based on the plurality of sensors, wherein the mapping and localization stack is configured to determine a plurality of candidate trajectories of the AV, wherein the planning stack is configured to: determine a convex hull of all centroid locations of the NPC that will result in collision between the NPC and AV, according to a first of the plurality of predicted trajectories of the NPC and a first of the plurality of candidate trajectories of the AV; recursively divide the convex hull into a plurality of triangular regions; for each of the plurality of triangular regions, determine a representative probability that the NPC will be in the triangular region, and determine a collision probability as a product of the representative probability and an area of the triangular region; determine a likelihood of collision between the NPC along the first predicted trajectory and the AV along the first candidate trajectory as a sum of the collision probabilities of the plurality of triangular regions; and select the first candidate trajectory among the plurality of candidate trajectories of the AV based on the determined likelihood of collision, and wherein the control stack is configured to control the vehicle propulsion, braking, and steering systems along the selected first candidate trajectory.

According to still another aspect, a method of controlling an AV is provided, which comprises: determining a convex hull of all centroid locations of an object (NPC) that will result in collision between the NPC and AV, according to a first predicted trajectory of the NPC and a first candidate trajectory of the AV; dividing the convex hull into a plurality of first triangular regions, each first triangular region sharing two vertices with two adjacent vertices of the convex hull and a third vertex with a centroid of the convex hull; dividing at least one first triangular region into four second triangular regions; for each of the plurality of first and second triangular regions: determining values of a probability density function at a location corresponding to each vertex of the triangular region and at a location corresponding to a centroid of the triangular region; statistically combining the determined probability density function values; and determining a collision probability as a product of the statistically combined probability density function values and an area of the triangular region; determining a likelihood of collision between the NPC along the first predicted trajectory and the AV along the first candidate trajectory as a sum of the collision probabilities of the plurality of triangular regions; selecting the first candidate trajectory among a plurality of candidate trajectories of the AV based on the determined likelihood of collision; and controlling the AV along the selected first candidate trajectory.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Briefly, as discussed above, the AV identifies nearby NPCs/objects and predicts possible trajectories thereof. The AV also determines different candidate trajectories for the AV, of which one is selected and used to control the AV (i.e., the AV will follow the selected candidate trajectory). The selection of the candidate trajectory for the AV is based at least in part on the likelihoods of collision with the predicted trajectories of the NPCs. In other words, it is preferable, where possible, to control an AV according to a trajectory that minimizes the likelihood of collision with an NPC.

As used herein, an NPC is an object other than the subject AV that a trajectory and/or likelihood of a possible collision is being determined. In some embodiments, an NPC may be a stationary object (e.g., a tree, a sign, etc.), another vehicle, and/or another moving object (e.g., a pedestrian).

In some embodiments, the likelihood of a collision between an AV and NPC is determined as a product of the probability density function PDF(x, y) that the NPC will be at a given location (x, (x, y)) and the area (the range of x and y) in which a collision would occur—in other words, an integration of the probability density function of the NPC location over the collision area. In some embodiments, a Reimann sum approach may be used to estimate the integral. However, such an approach suffers from a number of deficiencies.

Particularly, the Reimann sum approach can be very resource intensive, thus occupying processing resources that could otherwise be utilized by other functions of the AV. Further, such an approach can take a relatively long time (e.g., 10-20 ms to determine the likelihood of collision for a single combination of AV and NPC trajectories), thus limiting the number of determinations that can be prior to determining a new trajectory for the AV.

To compensate for this, a larger delta may be used for the Reimann sum. But this effectively lowers the resolution of the determination. For example, the Reimann sum may not be able to distinguish differences in probability over smaller distances (e.g., 10 cm). Still other compensations may ignore the full probability distribution and only consider a mean value. But this approach does not necessarily capture uncertainties at some locations, thereby potentially producing an overconfident determination (determining a low likelihood of collision when the real likelihood is greater). Conversely, inflating the probability (e.g., effectively expanding the integration area to include locations that would not actually produce a collision) has the effect of a pessimistic or otherwise underconfident determination (assuming a collision even if the real probability is low). The effect of these compensations may be a rough ride if late evasive or unnecessarily maneuvers are taken to avoid collisions.

In view of the above, the present disclosure includes a more efficient and accurate method for determining a likelihood of collision between an AV and NPC. Such a method can determine the likelihood of collision within about 2-3 ms and at a higher resolution than some other techniques. Trajectories of the AV selected based on these likelihoods of collision determined according to the methods herein can thus produce a smoother ride.

Figure 1:
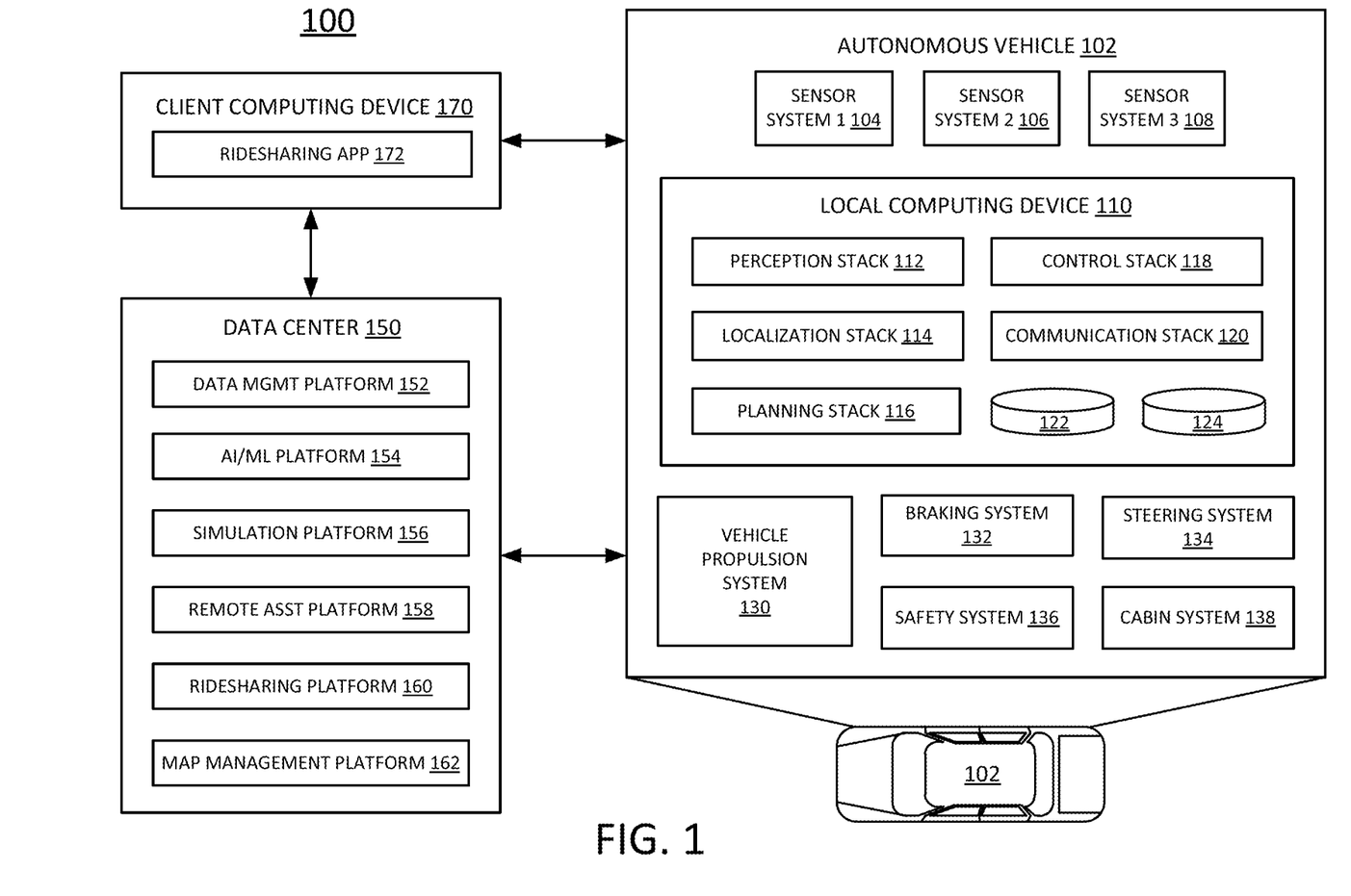
FIG. 1 illustrates an example system environment that can be used to facilitate autonomous vehicle (AV) dispatch and operations, according to some aspects of the disclosed technology.

Starting with FIG. 1, this figure illustrates an example of an AV management system 100 configured to determine the likelihood of collision between the AV 102 and an NPC, and accordingly select a trajectory and control the AV 102 according to the trajectory. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes the AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects (e.g., NPCs) and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data as discussed further below with respect to FIG. 5 and elsewhere in the present disclosure.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Figure 2:
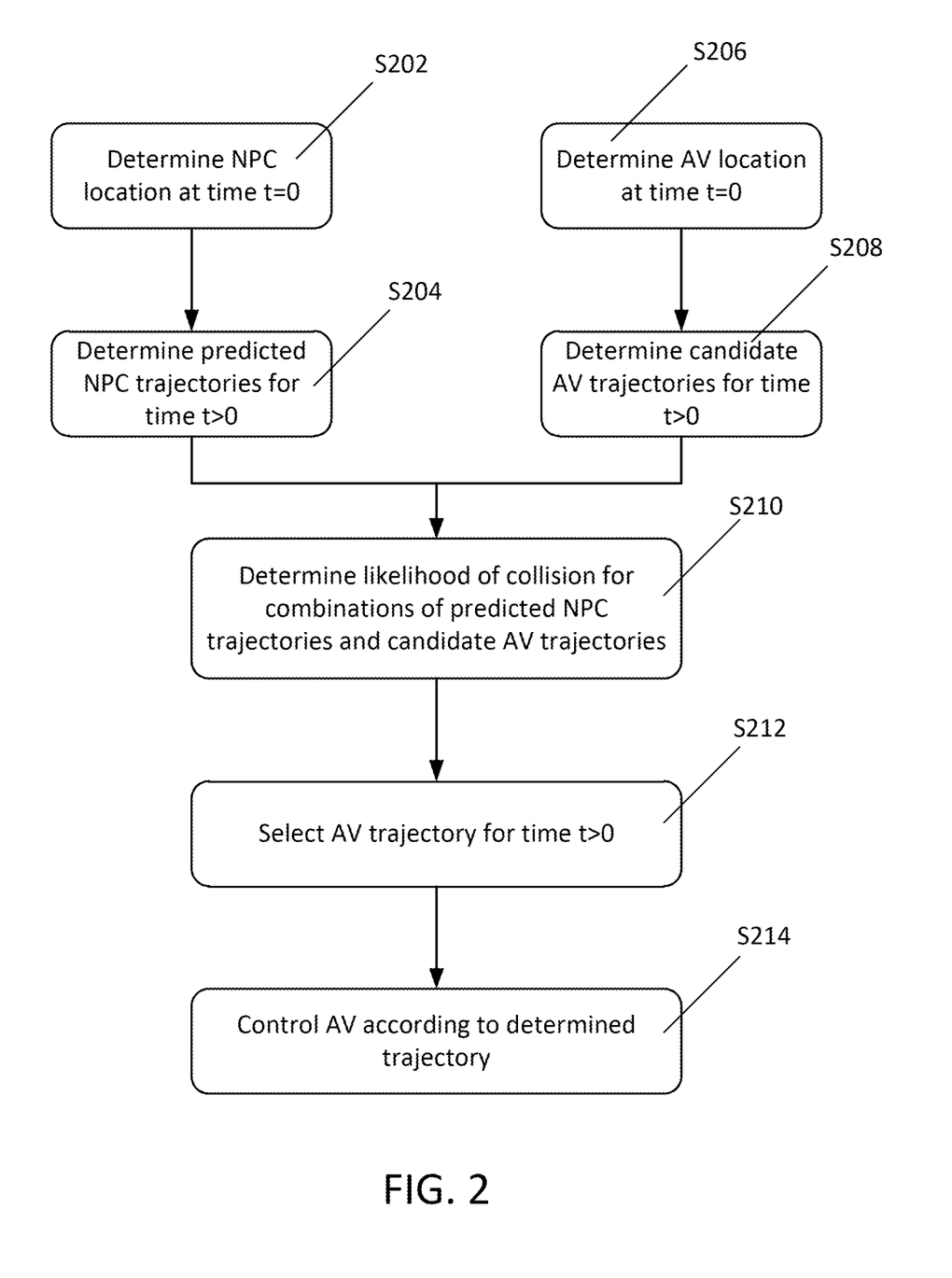
FIG. 2 illustrates a method for determining a trajectory of an AV, according to some examples of the present disclosure.

Turning now to FIG. 2, an example method for determining an AV trajectory and controlling the AV accordingly is illustrated. The method of FIG. 2 may be executed at regular intervals, for example, each time a new AV trajectory is selected. Further, in some embodiments the method may be executed for every NPC identified by the perception stack 112. However, in other embodiments the method may only be applied to identified NPCs satisfying threshold criteria in order to limit resource usage. For example, such criteria may include a distance between the AV and the NPC, the type of NPC, and the like.

As seen in FIG. 2, a current (time t=0) location of an NPC is determined at step S202. As noted above, the NPC location may be determined by the perception stack 112. Predicted trajectories (for a future time t>0) of the NPC are then determined at step S204. Again, these predicted trajectories may be determined by the perception stack 112. These predicted trajectories may be based on a deep learning model, and may be represented by a probability that the trajectory will be followed by the NPC (an occurrence probability) and a probability density function that the NPC will be at a position along or near the trajectory (a location probability). In parallel with the NPC determinations, the current AV location is determined at step S206, and candidate AV trajectories are identified at step S208. As noted above, the AV location and candidate trajectories may be determined by the mapping and localization stack 114.

With one or more predicted trajectories of the NPC and candidate trajectories of the AV, the method proceeds at step S210 by determining the likelihood of collision for one or more combinations of a predicted NPC trajectory and candidate AV trajectory. The determination at step S210 can be executed by the planning stack 116. In some embodiments, the likelihood of collision may be determined for every combination of trajectories. However, in other embodiments only NPC trajectories having an occurrence probability of a predetermined threshold are analyzed. In this way, computational resources are not wasted considering potential NPC trajectories that are unlikely to occur.

Once the likelihood of collision has been determined (for one or more NPCs, one or more NPC trajectories, and one or more AV candidate trajectories) at step S210, a candidate AV trajectory is selected based on the likelihoods of collision. Where possible, selection of the candidate AV trajectory preferably minimizes a total likelihood of collision among all NPCs, other factors may be considered in the selection. For example, the selection may be based on weighted likelihoods of collision. In such cases, the likelihood of collision may be weighted based on NPC type, distance, or the like, whereby the likelihood of collision with a first NPC that is larger and closer to the AV may be given more weight. Accordingly, the selected AV trajectory may minimize the likelihood of collision with the first NPC even though it may ultimately increase a likelihood of collision with another second NPC at a time further in the future. The likelihood of collision with the second NPC can then be minimized by selecting a different AV trajectory after any risk with the first NPC is mitigated. The selected AV trajectory may also be based on the other criteria examined by the planning stack 116 (e.g., traffic rules, road conditions, mapping, and the like).

Finally, the AV may be controlled at step S214 according to the AV trajectory selected at step S212. The AV may be controlled at step S214 by the control stack 118 as described above.

Figure 3A:
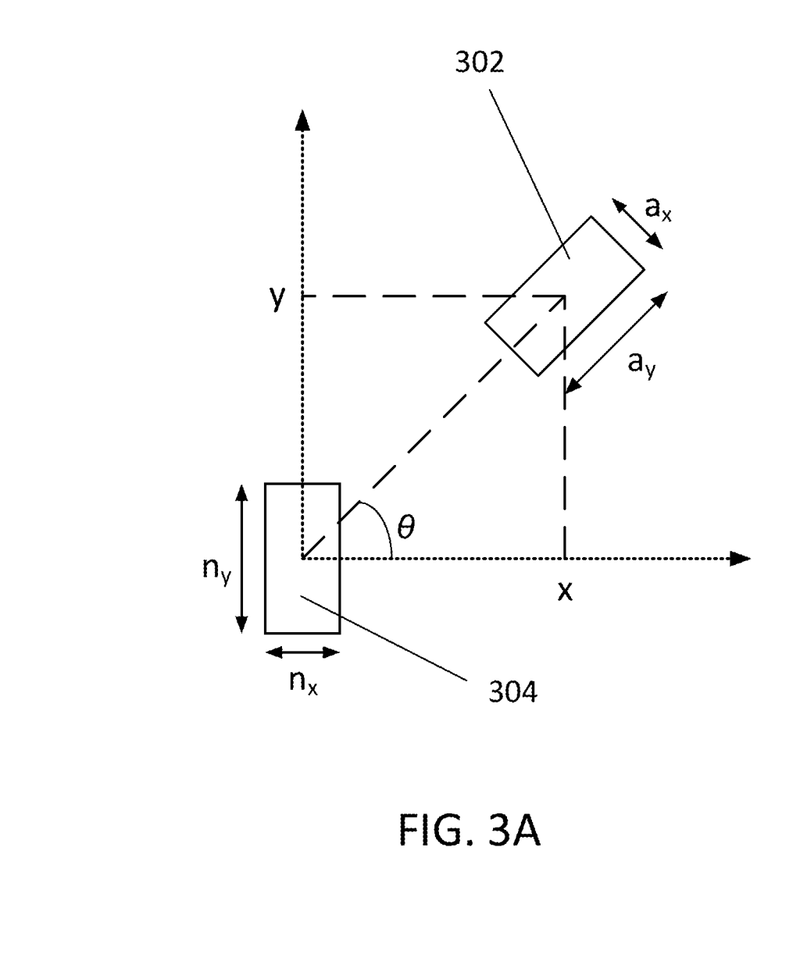
FIG. 3A illustrates a reference system for determining relative locations of an AV and non-player character (NPC), according to some examples of the present disclosure.
Figure 3B:
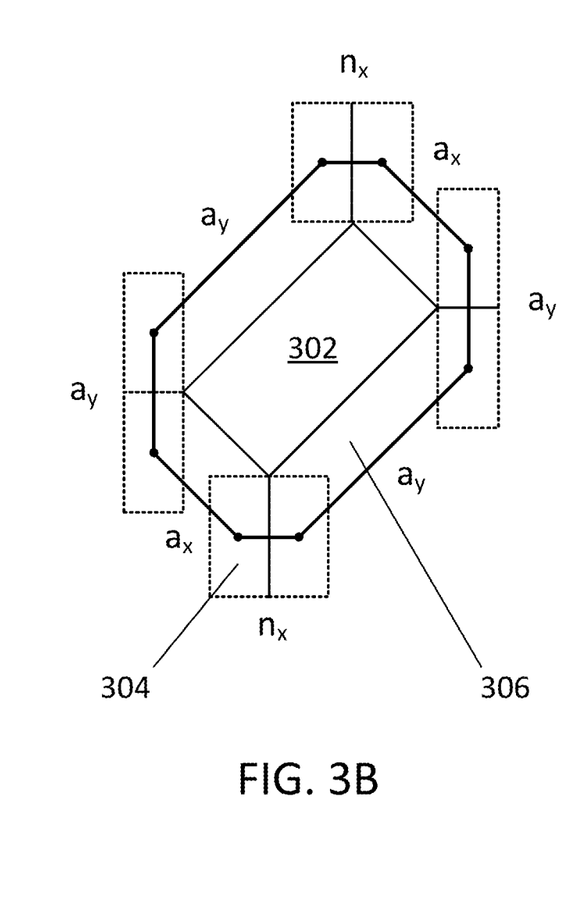
FIG. 3B illustrates a convex hull of possible collision locations between an AV and NPC, according to some examples of the present disclosure.

The following description relates to example methods for efficiently determining the likelihood of collision according to step S210. While the description is provided in two dimensions, it should be understood that the methods described herein could be expanded to three dimensions. With reference to FIGS. 3A and 3B, an AV 302 is projected into the coordinate fame and of an NPC 304. The AV 302 is represented as a rectangular bounding box of width $a_x$ and length $a_y$, and the NPC 304 is represented as a rectangular bounding box of width $n_x$ and length $n_y$. A centroid of the NPC 304 at an origin the coordinate frame and a centroid of the AV 302 at a position (a.x, a.y) and at an angle θ. From this, the locations of the four vertices (a(i).x, a(i).y) for i=1:4 of the AV 302 in the NPC coordinate frame are thus:

$$a(i).x = x \pm \frac{\sqrt{a_x^2 + a_y^2}}{2} \cos\left(\theta \pm \tan^{-1}\frac{a_x}{a_y}\right)$$

$$a(i).y = y \pm \frac{\sqrt{a_x^2 + a_y^2}}{2} \sin\left(\theta \pm \tan^{-1}\frac{a_x}{a_y}\right)$$

As seen in FIG. 3B, the convex hull 306 of all NPC 304 centroids that collide with the AV 302 can be found by 'sliding' the NPC 304 around the perimeter of the AV polygon. In other words, the convex hull 306 is a polygon that defines all locations at which the NPC and AV would collide (where the bounding box of the NPC 304 and AV 302 overlap and thus occupy the same location). For the rectangular polygons of the present illustration, the convex hull 306 is an octagon. The locations of the eight vertices (o(i).x, o(i).y) for i=1:8 of the convex hull 306 in the NPC coordinate frame are thus:

$$o(i).x = x \pm \frac{\sqrt{a_x^2 + a_y^2}}{2} \cos\left(\theta \pm \tan^{-1}\frac{a_x}{a_y}\right) \pm \frac{\sqrt{n_x^2 + n_y^2}}{2} \sin\left(\tan^{-1}\frac{n_x}{n_y}\right)$$

$$o(i).y = y \pm \frac{\sqrt{a_x^2 + a_y^2}}{2} \sin\left(\theta \pm \tan^{-1}\frac{a_x}{a_y}\right) \pm \frac{\sqrt{n_x^2 + n_y^2}}{2} \cos\left(\tan^{-1}\frac{n_x}{n_y}\right)$$

As noted above, the likelihood of collision can be determined by integrating the probability density function PDF(x, y) for a predicted NPC trajectory over the convex hull 306 (the collision area). Two example methods for efficiently determining the likelihood of collision S210 are illustrated in FIGS. 4 and 5.

Figure 4:
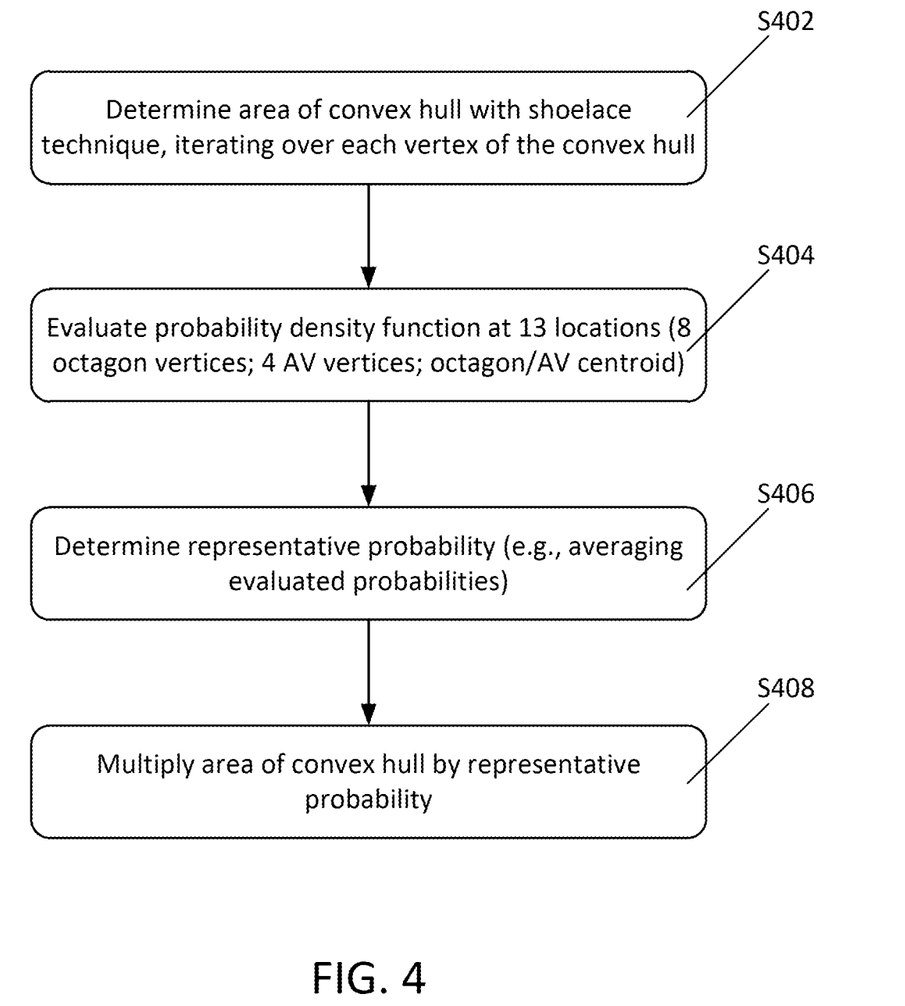
FIG. 4 illustrates a first method for determining a likelihood of collision with an NPC, according to some examples of the present disclosure.
Figure 5:
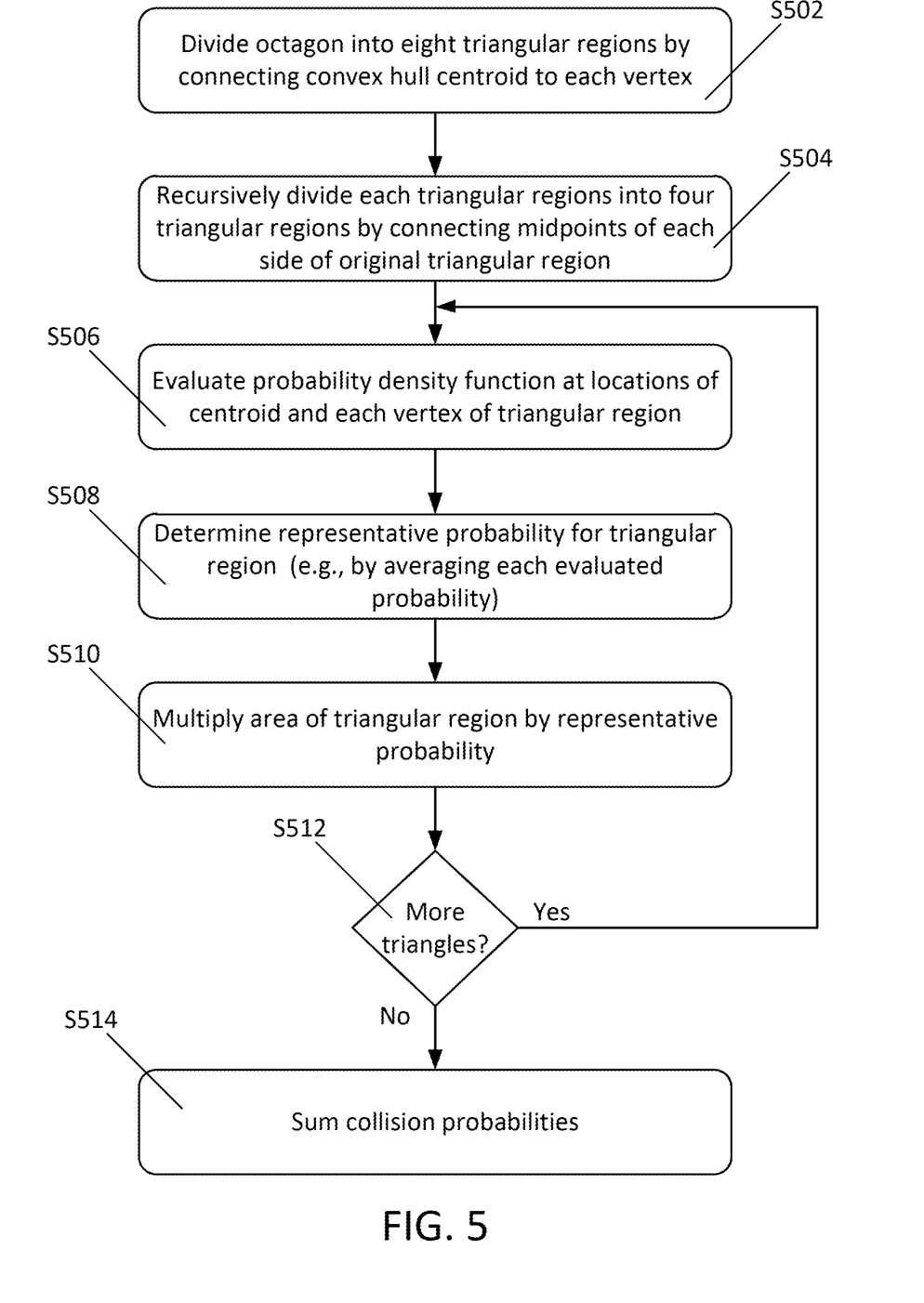
FIG. 5 illustrates a second method based on recursive triangulation for determining a likelihood of collision with an NPC, according to some examples of the present disclosure.

According to the method of FIG. 4, the area of the convex hull 306 is first determined at step S402. This area may be determined, for example, with a shoelace (Gauss) technique by iterating over each vertex of the convex hull 306. In some cases, the shoelace technique involves cross-multiplying the coordinates of the vertices of the convex hull 306. For example, the area of the convex hull 306 may be given as one of:

$$A = \frac{1}{2}\sum_{i=1}^{n}(o(i).y + o(i+1).y)(o(i).x - o(i+1).x)$$

$$A = \frac{1}{2}\sum_{i=1}^{n}(o(i).x \cdot o(i+1).y - o(i+1).x \cdot o(i).y)$$

In addition to determining the area, the probability density function is evaluated at step S404 at each vertex of the convex hull 306, each vertex of the AV 302, and at the centroid of the convex hull 306 (which is also the centroid of the AV 302). In the case of a convex hull that is an octagon, this corresponds to the evaluation of the probability density function at 13 locations. A representative probability is then determined at step S406. The representative probability may be determined by any statistical combination of the evaluated probabilities. For example, each of the evaluated probabilities may be averaged to determine the representative probability.

Finally, the area of the convex hull 306 determined in step S402 is multiplied by the representative probability determined in step S408. The resulting product is the likelihood of collision.

Figure 6:
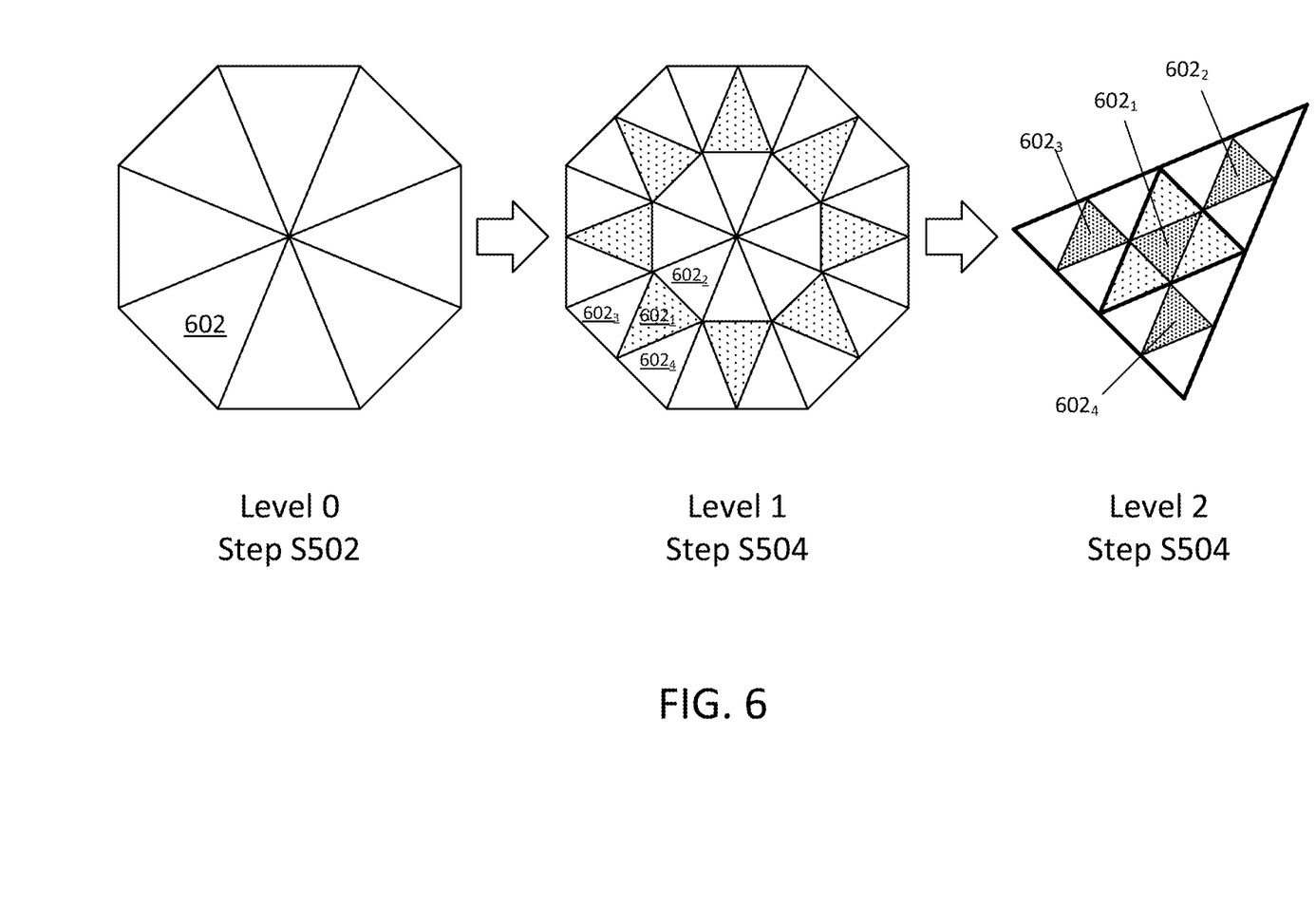
FIG. 6 illustrates recursive triangulation of a convex hull, according to some examples of the present disclosure.

A second method for determining the likelihood of collision S210 based on recursive triangulation is illustrated in FIG. 5. With reference to FIG. 6, the convex hull 306 (illustrated in FIG. 6 as a regular octagon) is first divided into eight first triangular regions 602 at step S502. These triangular regions 602 are formed by connecting the centroid of the convex hull 306 to each vertex of the convex hull 306. Accordingly, each first triangular region 602 as one vertex at the centroid of the convex hull 306, and two vertices at two adjacent vertices of the convex hull 306.

Each first triangular region 602 is then further recursively divided into four second triangular regions $602_1$-$602_4$ by connecting the midpoints of each side of the triangular region 602, similar to the Sierpiński method. The second triangular regions $602_1$-$602_4$ include a center second triangular region $602_1$ that has vertices at midpoints of the sides of the first triangular region 602. Th second triangular regions $602_1$-$602_4$ also include three surrounding second triangular regions $602_2$-$602_4$ each having two vertices at midpoints of adjacent sides of the first triangular region 602, and sharing a third vertex with a vertex or the centroid of the convex hull 306. This represents a first level of recursion.

Depending on the embodiment, the level of recursion may be fixed or dynamic, for example, based on the hardware of the AV 102. In one example, the method utilizes at least two levels of recursion. Therefore, each triangular region $602_1$-$602_4$ would be further divided in to four more triangular regions. In some examples, only the outer triangular regions (e.g., $602_2$-$602_4$) are further divided, while the center triangular region (e.g., $602_1$) is not further divided. However, any number (including all) of the triangular regions may be further divided at any level of recursion.

Following recursive triangulation, steps S506-S510 are performed for each resulting triangular region. More particularly, the value of the probability density function is determined at the locations of the centroid and each vertex of the triangular region at step S506. A representative probability is then determined for the triangular region at step S508. As with the method of FIG. 4, the representative probability maybe any statistical combination of the evaluated probabilities, such as an average of the evaluated probabilities. The representative probability is then multiplied by the area of the triangular region at step S510. At step S512, it is determined whether there are more triangular regions to analyze and, if so, the method repeats steps S506-S510.

Finally, the likelihoods of collision from step S510 for every triangular region are summed. The summation result is the likelihood of collision for the entire convex hull 306.

Selected Examples

Example 1 provides a method of controlling an autonomous vehicle (AV) comprising: determining a convex hull of all centroids locations of an object (NPC) that will result in collision between the NPC and AV, according to a first predicted trajectory of the NPC and a first candidate trajectory of the AV; recursively dividing the convex hull into a plurality of triangular regions; for each of the plurality of triangular regions, determining a representative probability that the NPC will be in the triangular region, and determining a collision probability as a product of the representative probability and an area of the triangular region; determining a likelihood of collision between the NPC along the first predicted trajectory and the AV along the first candidate trajectory as a sum of the collision probabilities of the plurality of triangular regions; selecting the first candidate trajectory among a plurality of candidate trajectories of the AV based on the determined likelihood of collision; and controlling the AV along the selected first candidate trajectory.

Example 2 provides a method of controlling an AV according to one or more of the preceding and/or following examples, comprising determining likelihoods of collision between a plurality of NPCs and the first candidate trajectory of the AV.

Example 3 provides a method of controlling an AV according to one or more of the preceding and/or following examples, comprising determining likelihoods of collision between a plurality of predicted trajectories of the NPC and the first candidate trajectory of the AV.

Example 4 provides a method of controlling an AV according to one or more of the preceding and/or following examples, comprising determining likelihoods of collision between the first predicted trajectory of the NPC and the plurality of candidate trajectories of the AV.

Example 5 provides a method of controlling an AV according to one or more of the preceding and/or following examples, wherein recursively dividing the convex hull into a plurality of triangular regions comprises: dividing the convex hull into a plurality of first triangular regions, each first triangular region sharing two vertices with two adjacent vertices of the convex hull and sharing a third vertex with a centroid of the convex hull.

Example 6 provides a method of controlling an AV according to one or more of the preceding and/or following examples, wherein recursively dividing the convex hull further comprises dividing at least one first triangular region into four second triangular regions, and wherein the four second triangular regions comprise a center second triangular region having vertices at midpoints of the sides of the at least one first triangular region, and three surrounding second triangular regions each having two vertices at midpoints of adjacent sides of the at least one first triangular region and sharing a third vertex with a vertex or the centroid of the convex hull.

Example 7 provides a method of controlling an AV according to one or more of the preceding and/or following examples, wherein recursively dividing the convex hull further comprises dividing at least one second triangular region into four third triangular regions.

Example 8 provides a method of controlling an AV according to one or more of the preceding and/or following examples, wherein determining a representative probability comprises: determining values of a probability density function at a location corresponding to each vertex of the triangular region and at a location corresponding to a centroid of the triangular region; and statistically combining the determined probability density function values.

Example 9 provides a method of controlling an AV according to one or more of the preceding and/or following examples, wherein statistically combining the determined values comprises averaging the determined probability density function values.

Example 10 an autonomous vehicle (AV) comprising: a plurality of sensors; a local computing device comprising one or more processors and memory configured to operate a perception stack, a mapping and localization stack, a planning stack, and a control stack; and vehicle propulsion, braking, and steering systems, wherein the perception stack is configured to identify an object (NPC) and predict a plurality of trajectories of the NPC based on the plurality of sensors, wherein the mapping and localization stack is configured to determine a plurality of candidate trajectories of the AV, wherein the planning stack is configured to: determine a convex hull of all centroid locations of the NPC that will result in collision between the NPC and AV, according to a first of the plurality of predicted trajectories of the NPC and a first of the plurality of candidate trajectories of the AV; recursively divide the convex hull into a plurality of triangular regions; for each of the plurality of triangular regions, determine a representative probability that the NPC will be in the triangular region, and determine a collision probability as a product of the representative probability and an area of the triangular region; determine a likelihood of collision between the NPC along the first predicted trajectory and the AV along the first candidate trajectory as a sum of the collision probabilities of the plurality of triangular regions; and select the first candidate trajectory among the plurality of candidate trajectories of the AV based on the determined likelihood of collision, and wherein the control stack is configured to control the vehicle propulsion, braking, and steering systems along the selected first candidate trajectory.

Example 11 provides an AV according to one or more of the preceding and/or following examples, wherein the planning stack is configured to determine likelihoods of collision between a plurality of NPCs and the first candidate trajectory of the AV.

Example 12 provides an AV according to one or more of the preceding and/or following examples, wherein the planning stack is configured to determine likelihoods of collision between the plurality of predicted trajectories of the NPC and the first candidate trajectory of the AV.

Example 13 provides an AV according to one or more of the preceding and/or following examples, wherein the planning stack is configured to determine likelihoods of collision between the first predicted trajectory of the NPC and the plurality of candidate trajectories of the AV.

Example 14 provides an AV according to one or more of the preceding and/or following examples, wherein the planning stack is configured to recursively divide the convex hull into a plurality of triangular regions by dividing the convex hull into a plurality of first triangular regions, each first triangular region sharing two vertices with two adjacent vertices of the convex hull and a third vertex with a centroid of the convex hull.

Example 15 provides an AV according to one or more of the preceding and/or following examples, wherein the planning stack is configured to recursively divide the convex hull into a plurality of triangular regions by further dividing at least one first triangular region into four second triangular regions, and wherein the four second triangular regions comprise a center second triangular region having vertices at midpoints of the sides of the at least one first triangular region, and three surrounding second triangular regions each having two vertices at midpoints of adjacent sides of the at least one first triangular region and sharing a third vertex with a vertex or the centroid of the convex hull.

Example 16 provides an AV according to one or more of the preceding and/or following examples, wherein the planning stack is configured to recursively divide the convex hull into a plurality of triangular regions by further dividing at least one second triangular region into four third triangular regions.

Example 17 provides an AV according to one or more of the preceding and/or following examples, wherein the planning stack is configured to determine the representative probability by: determining values of a probability density function at a location corresponding to each vertex of the triangular region and at a location corresponding to a centroid of the triangular region; and statistically combining the determined probability density function values.

Example 18 provides an AV according to one or more of the preceding and/or following examples, wherein statistically combining the determined values comprises averaging the determined probability density function values.

Example 19 provides a method of controlling an autonomous vehicle (AV) comprising: determining a convex hull of all centroid locations of an object (NPC) that will result in collision between the NPC and AV, according to a first predicted trajectory of the NPC and a first candidate trajectory of the AV; dividing the convex hull into a plurality of first triangular regions, each first triangular region sharing two vertices with two adjacent vertices of the convex hull and a third vertex with a centroid of the convex hull; dividing at least one first triangular region into four second triangular regions; for each of the plurality of first and second triangular regions: determining values of a probability density function at a location corresponding to each vertex of the triangular region and at a location corresponding to a centroid of the triangular region; statistically combining the determined probability density function values; and determining a collision probability as a product of the statistically combined probability density function values and an area of the triangular region; determining a likelihood of collision between the NPC along the first predicted trajectory and the AV along the first candidate trajectory as a sum of the collision probabilities of the plurality of triangular regions; selecting the first candidate trajectory among a plurality of candidate trajectories of the AV based on the determined likelihood of collision; and controlling the AV along the selected first candidate trajectory.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method of controlling an autonomous vehicle (AV) comprising: determining a convex hull of all centroid locations of an object that will result in collision between the object and the AV, according to a first predicted trajectory of the object and a first candidate trajectory of the AV;
   recursively dividing the convex hull into a plurality of triangular regions;
   for each of the plurality of triangular regions, determining a representative probability that the object will be in the triangular region, and determining a collision probability as a product of the representative probability and an area of the triangular region;
   determining a likelihood of collision between the object along the first predicted trajectory and the AV along the first candidate trajectory as a sum of the collision probabilities of the plurality of triangular regions;
   selecting the first candidate trajectory among a plurality of candidate trajectories of the AV based on the determined likelihood of collision; and
   controlling the AV along the selected first candidate trajectory.

2. The computer-implemented method of claim 1, comprising determining likelihoods of collision between a plurality of objects and the first candidate trajectory of the AV.

3. The computer-implemented method of claim 1, comprising determining likelihoods of collision between a plurality of predicted trajectories of the object and the first candidate trajectory of the AV.

4. The computer-implemented method of claim 1, comprising determining likelihoods of collision between the first predicted trajectory of the object and the plurality of candidate trajectories of the AV.

5. The computer-implemented method of claim 1, wherein recursively dividing the convex hull into a plurality of triangular regions comprises:
   dividing the convex hull into a plurality of first triangular regions, each first triangular region sharing two vertices with two adjacent vertices of the convex hull and sharing a third vertex with a centroid of the convex hull.

6. The computer-implemented method of claim 5,
   wherein recursively dividing the convex hull further comprises dividing at least one first triangular region into four second triangular regions, and
   wherein the four second triangular regions comprise a center second triangular region having vertices at midpoints of the sides of the at least one first triangular region, and three surrounding second triangular regions each having two vertices at midpoints of adjacent sides of the at least one first triangular region and sharing a third vertex with a vertex or the centroid of the convex hull.

7. The computer-implemented method of claim 6, wherein recursively dividing the convex hull further comprises dividing at least one second triangular region into four third triangular regions.

8. The computer-implemented method of claim 1, wherein determining a representative probability comprises:
   determining values of a probability density function at a location corresponding to each vertex of the triangular region and at a location corresponding to a centroid of the triangular region; and
   statistically combining the determined probability density function values.

9. The computer-implemented method of claim 8, wherein statistically combining the determined values comprises averaging the determined probability density function values.

10. An autonomous vehicle (AV) comprising:
    a plurality of sensors;
    a local computing device comprising one or more processors and memory configured to operate a perception stack, a mapping and localization stack, a planning stack, and a control stack; and
    vehicle propulsion, braking, and steering systems,
    wherein the perception stack is configured to identify an object and predict a plurality of trajectories of the object based on the plurality of sensors, wherein the mapping and localization stack is configured to determine a plurality of candidate trajectories of the AV, wherein the planning stack is configured to:

determine a convex hull of all centroid locations of the object that will result in collision between the object and the AV, according to a first of the plurality of predicted trajectories of the object and a first of the plurality of candidate trajectories of the AV;

recursively divide the convex hull into a plurality of triangular regions;

for each of the plurality of triangular regions, determine a representative probability that the object will be in the triangular region, and determine a collision probability as a product of the representative probability and an area of the triangular region;

determine a likelihood of collision between the object along the first predicted trajectory and the AV along the first candidate trajectory as a sum of the collision probabilities of the plurality of triangular regions; and select the first candidate trajectory among the plurality of candidate trajectories of the AV based on the determined likelihood of collision, and wherein the control stack is configured to control the vehicle propulsion, braking, and steering systems along the selected first candidate trajectory.

11. The AV of claim 1, wherein the planning stack is configured to determine likelihoods of collision between a plurality of objects and the first candidate trajectory of the AV.

12. The AV of claim 1, wherein the planning stack is configured to determine likelihoods of collision between the plurality of predicted trajectories of the object and the first candidate trajectory of the AV.

13. The AV of claim 1, wherein the planning stack is configured to determine likelihoods of collision between the first predicted trajectory of the object and the plurality of candidate trajectories of the AV.

14. The AV of claim 1, wherein the planning stack is configured to recursively divide the convex hull into a plurality of triangular regions by dividing the convex hull into a plurality of first triangular regions, each first triangular region sharing two vertices with two adjacent vertices of the convex hull and a third vertex with a centroid of the convex hull.

15. The AV of claim 14, wherein the planning stack is configured to recursively divide the convex hull into a plurality of triangular regions by further dividing at least one first triangular region into four second triangular regions, and wherein the four second triangular regions comprise a center second triangular region having vertices at midpoints of the sides of the at least one first triangular region, and three surrounding second triangular regions each having two vertices at midpoints of adjacent sides of the at least one first triangular region and sharing a third vertex with a vertex or the centroid of the convex hull.

16. The AV of claim 15, wherein the planning stack is configured to recursively divide the convex hull into a plurality of triangular regions by further dividing at least one second triangular region into four third triangular regions.

17. The AV of claim 1, wherein the planning stack is configured to determine the representative probability by:

determining values of a probability density function at a location corresponding to each vertex of the triangular region and at a location corresponding to a centroid of the triangular region; and statistically combining the determined probability density function values.

18. The AV of claim 17, wherein statistically combining the determined values comprises averaging the determined probability density function values.

19. A computer-implemented method of controlling an autonomous vehicle (AV) comprising: determining a convex hull of all centroid locations of an object that will result in collision between the object and the AV, according to a first predicted trajectory of the object and a first candidate trajectory of the AV;

dividing the convex hull into a plurality of first triangular regions, each first triangular region sharing two vertices with two adjacent vertices of the convex hull and a third vertex with a centroid of the convex hull;

dividing at least one first triangular region into four second triangular regions;

for each of the plurality of first and second triangular regions:

determining values of a probability density function at a location corresponding to each vertex of the triangular region and at a location corresponding to a centroid of the triangular region;

statistically combining the determined probability density function values; and determining a collision probability as a product of the statistically combined probability density function values and an area of the triangular region;

determining a likelihood of collision between the object along the first predicted trajectory and the AV along the first candidate trajectory as a sum of the collision probabilities of the plurality of triangular regions;

selecting the first candidate trajectory among a plurality of candidate trajectories of the AV based on the determined likelihood of collision; and controlling the AV along the selected first candidate trajectory.

20. The computer-implemented method of claim 19, further comprising:

dividing each of the four second triangular region into four third triangular regions, wherein values of the probability density function are determined and statistically combined, and the collision probability is determined, for each of the third triangular regions, and wherein statistically combining the determined values comprises averaging the determined probability density function values.

* * * * *